United States Patent
Avetisov et al.

(10) Patent No.: US 9,648,015 B1
(45) Date of Patent: *May 9, 2017

(54) SYSTEMS AND METHODS FOR FACILITATING SECURE AUTHENTICATION USING A BIOMETRIC-ENABLED TRANSITORY PASSWORD AUTHENTICATION DEVICE

(71) Applicant: HYPR Corp., New York, NY (US)

(72) Inventors: George Avetisov, New York, NY (US); Roman Kadinsky, New York, NY (US); Bojan Simic, New York, NY (US)

(73) Assignee: HYPR CORP., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/538,768

(22) Filed: Nov. 11, 2014

(51) Int. Cl.
   *H04L 29/06* (2006.01)
(52) U.S. Cl.
   CPC ........ *H04L 63/0861* (2013.01); *H04L 63/083* (2013.01)
(58) Field of Classification Search
   CPC .......................... H04L 63/0861; H04L 63/083
   See application file for complete search history.

(56) References Cited

U.S. PATENT DOCUMENTS

| | | | |
|---|---|---|---|
| 6,167,517 A | 12/2000 | Gilchrist et al. | |
| D494,175 S | 8/2004 | Kawasaki | |
| D516,069 S | 2/2006 | Kuroda | |
| D522,510 S | 6/2006 | Su | |
| D537,820 S | 3/2007 | Hsu | |
| D542,291 S | 5/2007 | Kang | |
| 7,269,737 B2 | 9/2007 | Robinson | |
| D591,706 S | 5/2009 | Constin | |
| D592,660 S | 5/2009 | Wang | |

(Continued)

OTHER PUBLICATIONS

Grekov et al. (WO 2014/141263, International Publication Date Sep. 18, 2014).*

(Continued)

*Primary Examiner* — Oleg Korsak
(74) *Attorney, Agent, or Firm* — Pillsbury Winthrop Shaw Pittman LLP

(57) ABSTRACT

Secure authentication may be facilitated using a biometric-enabled transitory password authentication device. Exemplary implementations may facilitate secure payments and/or authentication via an application running on a user computing platform (e.g., a mobile device) simultaneously coordinating with both a server and the authentication device, which may act in some respects as an external hardware token. Exemplary implementations may rely on combining three parameters to establish a three-factor based approach to authentication in a fraud-free manner for digital wallets, third-party software, and/or other purposes. The three-factor based approach to authentication may require something the user possesses (e.g., the authentication device), something the user is (e.g., a biometric identifier such as a fingerprint), and something the user knows (e.g., an image or numeric based pin used to unlock the authentication device). The authentication device may include a time-based one-time password (TOTP) generator made accessible by a fingerprint matching algorithm.

20 Claims, 2 Drawing Sheets

(56) References Cited

U.S. PATENT DOCUMENTS

| | | |
|---|---|---|
| D593,559 S | 6/2009 | Lin |
| D649,548 S | 11/2011 | Szoke |
| 8,117,438 B1 * | 2/2012 | Albisu .................... H04L 12/58 380/229 |
| D661,211 S | 6/2012 | Hou |
| D698,792 S | 2/2014 | Lin |
| D703,205 S | 4/2014 | Tamura |
| 8,838,502 B2 | 9/2014 | Niwa |
| D718,307 S | 11/2014 | Ozolins |
| D741,862 S | 10/2015 | Beroukhim |
| 2003/0229811 A1 | 12/2003 | Siegel et al. |
| 2007/0067642 A1 * | 3/2007 | Singhal .................... G06F 21/32 713/186 |
| 2014/0289833 A1 | 9/2014 | Briceno |

OTHER PUBLICATIONS

M'Raihi et al., Internet Engineering Task Force, TOTP: Time-Based One-Time Password Algorithm; Request for Comments; 6238, May 2011, 16 pages).

* cited by examiner

SYSTEMS AND METHODS FOR FACILITATING SECURE AUTHENTICATION USING A BIOMETRIC-ENABLED TRANSITORY PASSWORD AUTHENTICATION DEVICE

FIELD OF THE DISCLOSURE

This disclosure relates to systems and methods for facilitating secure authentication using a biometric-enabled transitory password authentication device.

BACKGROUND

In the rising world of mobile commerce, two-factor authentication is no longer regarded as a secure protocol.

SUMMARY

One aspect of the disclosure relates to a system configured for facilitating secure authentication using a biometric-enabled transitory password authentication device. Such secure authentication may be necessary to facilitate various transactions. According to various implementations, a given transaction may involve one or more of authentication of third-party applications, authentication of debit card payments, authentication of regulated and secure digital currency (e.g., bitcoin) based payment services, use of credit cards via the NFC transmission protocol, QR-based authentication and payment services, and/or other transactions which require sensitive data.

Exemplary implementations of the system may facilitate secure payments and/or authentication via an application running on a user computing platform (e.g., a mobile device) simultaneously coordinating with both a server and the authentication device, which may act in some respects as an external hardware token. Exemplary implementations may rely on combining three parameters to establish a three-factor based approach to authentication in a fraud-free manner for digital wallets, third-party software, and/or other purposes. The three-factor based approach to authentication may require something the user possesses (e.g., the authentication device), something the user is (e.g., a biometric identifier such as a fingerprint), and something the user knows (e.g., an image or numeric based pin used to unlock the authentication device).

According to exemplary implementations, the authentication device may by an adhesive device with an on-board Bluetooth microcontroller, a microprocessor, a fingerprint scanner, a battery cell, and/or other components. The authentication device may include a time-based one-time password (TOTP) generator and fingerprint matching algorithm. The user computing platform may include a user's mobile device, wearable device, desktop unit, and/or any other device which is linked to the authentication device. The user computing platform may run a digital wallet software application and/or third-party software with an application program interface (API) enabled in order to receive authentication transmissions from the authentication device. The server may generate TOTP tokens in sync with the authentication device. At the time of a transaction authorization, the server may receive a command from the authentication device by way of the user computing platform. The server may decrypt the incoming command, verify the token, and perform a requested transaction.

According to some implementations, the system may include a user computing platform communicatively coupled with the authentication device. The system may include one or more servers. The server(s) may be configured to communicate with the user computing platform according to a client/server architecture. A user may access the system via the user computing platform.

The authentication device may be configured to provide a biometric-enabled transitory password to facilitate secure authentication. The authentication device may include a tamper proof casing and internal components. The authentication device may be configured to run a secured and untethered operating system. The authentication device may be configured to be disposed proximate to the user computing platform. In some implementations, the authentication device may be configured to adhere to an external surface of the user computing platform. Such a form factor may be akin to a sticker that can be adhered, for example, to the back of a smartphone. In some implementations, the authentication device may be embodied within a case configured to removably attached to and cover a portion of user computing platform.

The authentication device may include one or more of a biometric sensor, a communications interface, a power supply, and/or other components. The biometric sensor may be configured to obtain a biometric sample from a user. The communications interface may be configured to provide communications capabilities to the authentication device. The power supply may be configured to provide electrical power to one or more components of the authentication device.

The authentication device may be configured to execute computer readable instructions. The computer readable instructions may include one or more of a biometric component, a transitory password component, a bio-pin component, an encryption component, a one-way communications component, and/or other components.

The biometric component may be configured to receive the biometric sample from the biometric sensor. The biometric component may be configured to verify the biometric sample obtained by the biometric sensor based on biometric information stored by the authentication device. In some implementations, verification of the biometric sample may be required in order to unlock the authentication device.

The transitory password component may be configured to provide a transitory password. The transitory password may change periodically based on passage of time. The transitory password may be provided responsive to the biometric sample being verified.

The bio-pin component may be configured to provide a bio-pin. The bio-pin may be an alphanumeric hash. The bio-pin may be based on one or more of a random number, a numeric representation of the biometric sample, a user code, and/or other information. A bio-pin associated with a given authentication device may be unique that device.

The encryption component may be configured to encrypt sensitive information stored by and/or transmitted by the authentication device. By way of non-limiting example, the sensitive information stored by and/or transmitted by the authentication device may include one or more of the transitory password provided by the transitory password component, a credit card number, a debit card number, an bank account number, a payment account number, a digital currency (e.g., bitcoin) private key, a password, other information pertaining to electronic payment platforms, and/or other sensitive information.

The one-way communications component may be configured to transmit information (e.g., the encrypted transitory password) to the user computing platform. The one-way communications component may be configured such that, while information may be transmitted by the authentication device, no information may be received by the authentication device. In some implementations, verification of the biometric sample may be required in order for the one-way communications component to allow information to be transmitted from the authentication device.

Referring now to the user computing platform, it may be configured to execute computer readable instructions. The computer readable instructions may include one or more of a user code component, an unlock-app component, a user interface component, an authentication initiation component, a transaction component, and/or other components.

The user code component may be configured to obtain a user code from a user. The unlock-app component may be configured to unlock an application running on the user computing platform responsive to the correct user code being obtained by the user code component.

The user interface component may be configured to provide a user interface presented via the user computing platform. In some implementations, the user interface may be configured to receive user instructions to perform a transaction that requires authentication.

The authentication initiation component may be configured to prompt the authentication device. The prompt may be configured to cause the authentication device to "wake up," turn on, become activated, and/or otherwise become ready to receive a biometric sample.

The transaction component may be configured to receive the transitory password (which may be encrypted) from the authentication device. In some implementations, the transitory password may be provided from the authentication device to the user computing platform only after (1) the user code has been successfully provided via the user computing platform and (2) the biometric sample has been successfully obtained and verified by the authentication device. The transaction component may be configured to sign transaction information associated with the transaction. Signing the transaction information may be based on the encrypted transitory password. The transaction information may be encrypted based on the encrypted transitory password. The transaction information may include information that describes the transaction and/or information that is necessary to perform the transaction. The transaction component may be configured to transmit the encrypted transitory password with the signed transaction information to the server(s).

Referring now to the server(s), they may be configured to execute computer readable instructions. The computer readable instructions may include one or more of a communications component, a decryption component, a server-side transitory password component, a verification component, a server-side transaction component, and/or other components.

The communications component may be configured to receive the encrypted transitory password from the user computing platform. The communications component may be configured to receive the signed transaction information from the user computing platform.

The decryption component may be configured to decrypt information received from the user computing platform. The decryption component may be configured to decrypt the encrypted transitory password. The decryption component may be configured to decrypt the signed transaction information.

The server-side transitory password component may be configured to provide a server-side transitory password that changes periodically based on passage of time. The server-side transitory password may be provided synchronously with the transitory password provided by the authentication device. The server-side transitory password may be the same as the transitory password provided by the authentication device.

The verification component may be configured to verify the user by determining whether the transitory password received from the user computing platform, once decrypted, is valid. Determining the validity of the decrypted transitory password may include determining whether the decrypted transitory password matches the server-side transitory password.

The server-side transaction component may be configured to facilitate the transaction responsive to the user being verified. Facilitating the transaction may include effectuating one or more of authentication of third-party applications, authentication of debit card payments, authentication of regulated and secure digital currency (e.g., bitcoin) based payment services, use of credit cards via the NFC transmission protocol, QR-based authentication and payment services, and/or other transactions which require sensitive data.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
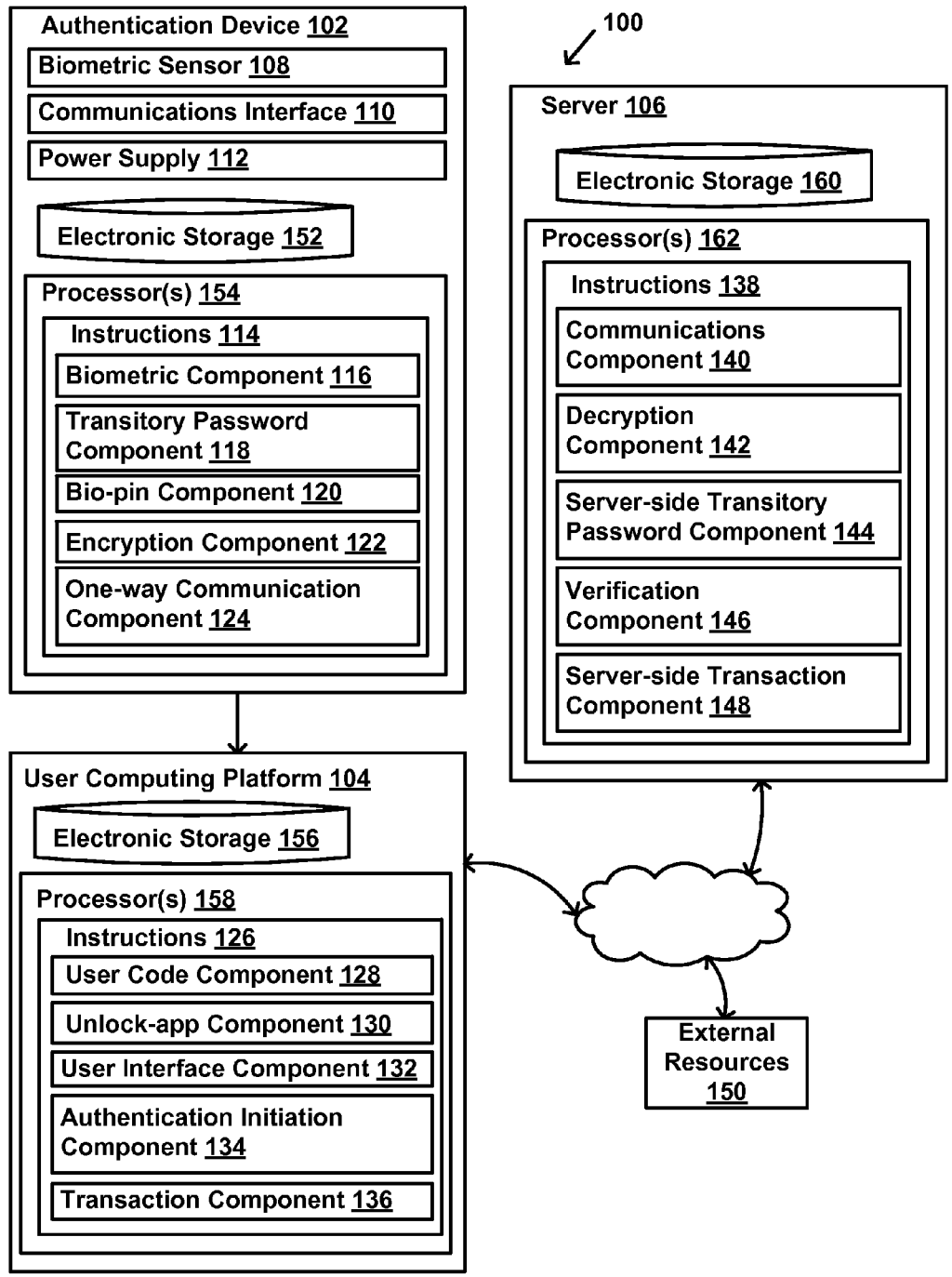
FIG. 1 illustrates a system configured for facilitating secure authentication using a biometric-enabled transitory password authentication device, in accordance with one or more implementations.

FIG. 1 illustrates a system 100 configured for facilitating secure authentication using a biometric-enabled transitory password authentication device 102, in accordance with one or more implementations. The system 100 may include a user computing platform 104 communicatively coupled with authentication device 102. The system 100 may include one or more servers 106. The server(s) 106 may be configured to communicate with user computing platform 104 according to a client/server architecture. A user may access system 100 via user computing platform 104.

The authentication device 102 may be configured to provide a biometric-enabled transitory password to facilitate secure authentication. The authentication device 102 may include a tamper proof casing and internal components. The authentication device 102 may be configured to run a secured and untethered operating system. The authentication device 102 may be configured to be disposed proximate to user computing platform 104. In some implementations, authentication device 102 may be configured to adhere to an external surface of user computing platform 104. Such a form factor may be akin to a sticker that can be adhered, for example, to the back of a smartphone. In some implementations, authentication device 102 may be embodied within a case configured to removably attached to and cover a portion of user computing platform. The authentication device 102 may include one or more of a biometric sensor 108, a communications interface 110, a power supply 112, and/or other components.

The biometric sensor 108 may be configured to obtain a biometric sample from a user. A biometric sample (also referred as a biometric identifier) may describe distinctive, measurable characteristics used to label and describe individuals. According to various implementations, the biometric sample may include one or more of fingerprint, palm veins, face recognition, DNA, palm print, hand geometry, iris recognition, retina, odor/scent, and/or other biometric samples. By way of non-limiting example, authentication device 102 may include a fingerprint scanner and/or other imaging technology configured to obtain information associated with fingerprint, palm veins, face recognition, DNA, palm print, hand geometry, iris recognition, retina, odor/scent, and/or other biometric samples. In some implementations, biometric sensor 108 may include a FPC-1080A fingerprint swipe scanner. In some implementations, the biometric sample may include behavioral characteristics related to the pattern of behavior of the user, which may be referred to as behaviometrics. The behaviometrics may include one or more of typing rhythm, gait, voice, and/or other behaviometrics.

The communications interface 110 may be configured to provide communications capabilities to authentication device 102. In some implementations, authentication device 102 may be configured for one-way communication such that information is transmitted from authentication device 102 to other locations (e.g., user computing platform 104) but no information is received by authentication device 102. Such a communications approach may wholly prevent or greatly alleviate the probability of authentication device 102 being hacked, tampered with, and/or otherwise compromised because foreign software code (e.g., computer viruses) cannot be introduced into authentication device 102. In some implementations, communications interface 110 may include a wireless technology standard for transmitting data over short distances such as Bluetooth, ZigBee, RuBee, and/or other suitable standards.

The power supply 112 may be configured to provide electrical power to one or more components of authentication device 102. The power supply 112 may include one or more of a battery, a capacitor, a solar cell, an electromagnetic induction circuit, and/or other power supplies. In some implementations, power supply 112 may include a rechargeable battery. In some implementations, power supply 112 may include a battery that stores sufficient electrical power to supply one or more components of authentication device 102 without charging for the lifetime of authentication device 102 (e.g., a month, several months, a year, several years, and/or other durations).

The authentication device 102 may be configured to execute computer readable instructions 114. The computer readable instructions 114 may include one or more of a biometric component 116, a transitory password component 118, a bio-pin component 120, an encryption component 122, a one-way communications component 124, and/or other components.

The biometric component 116 may be configured to receive the biometric sample from biometric sensor 108. The biometric component 116 may be configured to verify the biometric sample obtained by biometric sensor 108 based on biometric information stored by authentication device 102. In some implementations, verification of the biometric sample may be required in order to unlock authentication device 102. The biometric information stored by authentication device 102 and used to verify the biometric sample obtained by biometric sensor 108 may include an exemplar or template of the biometric sample. The biometric information may be stored by authentication device 102 during an initialization process during which the user provides the sample during set up of authentication device 102. The biometric information may be stored by authentication device 102 during manufacture of authentication device 102. By way of non-limiting example, a biometric sample comprising a fingerprint obtained by biometric sensor 108 may be verified by matching the fingerprint to a fingerprint exemplar or template stored by authentication device 102. In some implementations, biometric component 116 may utilize a fingerprint matching algorithm that is the same as or similar to the FPC-1080A matching algorithm available from Fingerprints Cards AB of Gothenburg, Sweden.

The transitory password component 118 may be configured to provide a transitory password. The transitory password may change periodically based on passage of time. The transitory password may be provided responsive to the biometric sample being verified. In some implementations, the transitory password may be a time-based one-time password (TOTP). The TOTP may be provided by an algorithm that computes a one-time password from a shared secret key and a current time. The TOTP may operate on Unix Time.

The bio-pin component 120 may be configured to provide a bio-pin. The bio-pin may be an alphanumeric hash. The bio-pin may be based on one or more of a random number, a numeric representation of the biometric sample, a user code, and/or other information. A bio-pin associated with a given authentication device 102 may be unique that device. In some implementations, the random number may be a "true" random number provided based on a measured physical phenomenon that is expected to be random. By way of non-limiting example, the measured physical phenomenon may include one or more of photons impinging on an imaging device (e.g., a charge-coupled device or CCD) atmospheric noise, thermal noise, cosmic background radiation, radioactive decay, other external electromagnetic and quantum phenomena, and/or other physical phenomena. The numeric representation of the biometric sample may be determined based on a numeric code sequence for a fingerprint image based on ridge flow patterns of the fingerprint. Other approaches for numerically representing a biometric sample are contemplated and are within the scope of the disclosure. The user code may by a code provided by the user. The user code may be an alphanumeric code. In some implementations, the user code may be a for digit number.

In some implementations, the bio-pin may be the master seed for generation of some or all wallet chains managed by system 100. For example, some or all wallet chains and/or public keys belonging to a user may be generated as the result of a hash resulting from the bio-pin. In some implementations, a wallet chain may be based on a bio-pin and the transitory password (e.g., TOTP) provided by transitory password component 118.

The encryption component 122 may be configured to encrypt sensitive information stored by and/or transmitted by authentication device 102. By way of non-limiting example, the sensitive information stored by and/or transmitted by authentication device 102 may include one or more of the transitory password provided by transitory password component 118, a credit card number, a debit card number, an bank account number, a payment account number, a digital currency (e.g., bitcoin) private key, a password, other information pertaining to electronic payment platforms, and/or other sensitive information. In some implementations, encryption component 122 may utilize 512 bit elliptic curve cryptography for PCI. Other encryption techniques are contemplated and are within the scope of the disclosure.

The one-way communications component 124 may be configured to transmit information (e.g., the encrypted transitory password) to user computing platform 104. The one-way communications component 124 may be configured such that, while information may be transmitted by authentication device 102, no information may be received by authentication device 102. In some implementations, verification of the biometric sample may be required in order for one-way communications component 124 to allow information to be transmitted from authentication device 102.

As described further herein, authentication device 102 may receive a prompt from user computing platform 104 that causes authentication device 102 to "wake up," turn on, become activated, and/or otherwise become ready to receive a biometric sample. Such a prompt, however, may not include any information that can corrupt authentication device 102 and may merely function to activate authentication device 102 from a power-saving mode.

Referring now to user computing platform 104 depicted in FIG. 1, it may be configured to execute computer readable instructions 126. The computer readable instructions 126 may include one or more of a user code component 128, an unlock-app component 130, a user interface component 132, an authentication initiation component 134, a transaction component 136, and/or other components.

The user code component 128 may be configured to obtain a user code from a user. The user code may be provided by the user via user computing platform 104. In some implementations, the user may enter the user code on a keypad of user computing platform 104. The user may provide the user code using a voice command received by user computing platform 104. The user code may be the same as or different from the user code utilized by bio-pin component 120 of authentication device 102.

The unlock-app component 130 may be configured to unlock an application running on user computing platform 104 responsive to the correct user code being obtained by user code component 128. In some implementations, unlocking the application may include allowing the application to open. In some implementations, unlocking the application may include enabling one or more features of the application when it is already running on user computing platform 104.

The user interface component 132 may be configured to provide a user interface presented via user computing platform 104. The user interface may be a graphical user interface (GUI). The user interface may be configured to provide information to the user. In some implementations, the user interface may be configured to present information associated with one or more transactions. The user interface may be configured to receive information from the user. In some implementations, the user interface may be configured to receive user instructions to perform a transaction that requires authentication. The user instructions may include a selection of a transaction, a command to perform a transaction, and/or information associated with a transaction. According to various implementations, a given transaction may involve one or more of authentication of third-party applications, authentication of debit card payments, authentication of regulated and secure digital currency (e.g., bitcoin) based payment services, use of credit cards via the NFC transmission protocol, QR-based authentication and payment services, and/or other transactions which require sensitive data.

The authentication initiation component 134 may be configured to prompt authentication device 102. The prompt may be configured to cause authentication device 102 to "wake up," turn on, become activated, and/or otherwise become ready to receive a biometric sample. Such a prompt, however, may not include any information that can corrupt authentication device 102 and may merely function to activate authentication device 102 from a power-saving mode. Once the biometric sample is received and verified by authentication device 102, authentication device 102 may provide the transitory password (which may be encrypted) to user computing platform 104.

The transaction component 136 may be configured to receive the transitory password (which may be encrypted) from authentication device 102. In some implementations, the transitory password may be provided from authentication device 102 to user computing platform 104 only after (1) the user code has been successfully provided via user computing platform 104 and (2) the biometric sample has been successfully obtained and verified by authentication device 102. The transaction component 136 may be configured to sign transaction information associated with the transaction. Signing the transaction information may be based on the encrypted transitory password. The transaction information may be encrypted based on the encrypted transitory password. The transaction information may include information that describes the transaction and/or information that is necessary to perform the transaction. The transaction component 136 may be configured to transmit the encrypted transitory password with the signed transaction information to server(s) 106.

Referring now to server(s) 106 depicted in FIG. 1, they may be configured to execute computer readable instructions 138. The computer readable instructions 138 may include one or more of a communications component 140, a decryption component 142, a server-side transitory password component 144, a verification component 146, a server-side transaction component 148, and/or other components.

The communications component 140 may be configured to receive the encrypted transitory password from user computing platform 104. The communications component 140 may be configured to receive the signed transaction information from user computing platform 104.

The decryption component 142 may be configured to decrypt information received from user computing platform 104. The decryption component 142 may be configured to decrypt the encrypted transitory password. The decryption component 142 may be configured to decrypt the signed transaction information.

The server-side transitory password component 144 may be configured to provide a server-side transitory password that changes periodically based on passage of time. In some implementations, the transitory password may be a time-based one-time password (TOTP). The TOTP may be provided by an algorithm that computes a one-time password from a shared secret key and a current time. The TOTP may operate on Unix Time. The server-side transitory password may be provided synchronously with the transitory password provided by authentication device 102. The server-side transitory password may be the same as the transitory password provided by authentication device 102.

The verification component 146 may be configured to verify the user by determining whether the transitory password received from user computing platform 104, once decrypted, is valid. Determining the validity of the decrypted transitory password may include determining whether the decrypted transitory password matches the server-side transitory password.

The server-side transaction component 148 may be configured to facilitate the transaction responsive to the user being verified. Facilitating the transaction may include effectuating one or more of authentication of third-party applications, authentication of debit card payments, authentication of regulated and secure digital currency (e.g., bitcoin) based payment services, use of credit cards via the NFC transmission protocol, QR-based authentication and payment services, and/or other transactions which require sensitive data.

In some implementations, server(s) 106, user computing platform 104, and/or external resources 150 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 106, user computing platform 104, and/or external resources 150 may be operatively linked via some other communication media.

External resources 150 may include sources of information, hosts and/or providers of transaction platforms outside of system 100, external entities participating with system 100, and/or other resources. In some implementations, some or all of the functionality attributed herein to external resources 150 may be provided by resources included in system 100.

The authentication device 102 may include electronic storage 152, one or more processors 154, and/or other components. Illustration of authentication device 102 in FIG. 1 is not intended to be limiting. Authentication device 102 may include a plurality of hardware, software, and/or firmware components operating together to provide the functionality attributed herein to authentication device 102.

The user computing platform 104 may include electronic storage 156, one or more processors 158, and/or other components. The user computing platform 104 may include communication lines, or ports to enable the exchange of information with a network and/or other computing platforms. Illustration of user computing platform 104 in FIG. 1 is not intended to be limiting. The user computing platform 104 may include a plurality of hardware, software, and/or firmware components operating together to provide the functionality attributed herein to user computing platform 104. By way of non-limiting example, user computing platform 104 may include one or more of a desktop computer, a laptop computer, a handheld computer, a tablet computing platform, a NetBook, a Smartphone, a gaming console, and/or other computing platforms.

The server(s) 106 may include electronic storage 160, one or more processors 162, and/or other components. The server(s) 106 may include communication lines, or ports to enable the exchange of information with a network and/or other computing platforms. Illustration of server(s) 106 in FIG. 1 is not intended to be limiting. The server(s) 106 may include a plurality of hardware, software, and/or firmware components operating together to provide the functionality attributed herein to server(s) 106. For example, server(s) 106 may be implemented by a cloud of computing platforms operating together as server(s) 106.

Electronic storage 152, 156, and/or 160 may comprise non-transitory storage media that electronically stores information. The electronic storage media of electronic storage 152, 156, and/or 160 may include one or both of system storage that is provided integrally (i.e., substantially non-removable) with a respective component of system 100 and/or removable storage that is removably connectable to a respective component of system 100 via, for example, a port (e.g., a USB port, a firewire port, etc.) or a drive (e.g., a disk drive, etc.). Electronic storage 152, 156, and/or 160 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 152, 156, and/or 160 may include one or more virtual storage resources (e.g., cloud storage, a virtual private network, and/or other virtual storage resources). Electronic storage 152, 156, and/or 160 may store software algorithms, information determined by a processor, and/or other information that enables components of system 100 to function as described herein.

The processor(s) 154 of authentication device 102 may be configured to provide information processing capabilities in authentication device 102. As such, processor(s) 154 may include one or more of a digital processor, an analog processor, a digital circuit designed to process information, an analog circuit designed to process information, a state machine, and/or other mechanisms for electronically processing information. Although processor(s) 154 is shown in FIG. 1 as a single entity, this is for illustrative purposes only. In some implementations, processor(s) 154 may include a plurality of processing units. The processor(s) 154 may be configured to execute computer readable instruction components 116, 118, 120, 122, 124, and/or other components. The processor(s) 154 may be configured to execute components 116, 118, 120, 122, 124, and/or other components by software; hardware; firmware; some combination of software, hardware, and/or firmware; and/or other mechanisms for configuring processing capabilities on processor(s) 154.

The description of the functionality provided by the different components 116, 118, 120, 122, and/or 124 described herein is for illustrative purposes, and is not intended to be limiting, as any of components 116, 118, 120, 122, and/or 124 may provide more or less functionality than is described. For example, one or more of components 116, 118, 120, 122, and/or 124 may be eliminated, and some or all of its functionality may be provided by other ones of components 116, 118, 120, 122, and/or 124. As another example, processor(s) 154 may be configured to execute one or more additional computer readable instruction components that may perform some or all of the functionality attributed below to one of components 116, 118, 120, 122, and/or 124.

The processor(s) 158 of user computing platform 104 may be configured to provide information processing capabilities in user computing platform 104. As such, processor(s) 158 may include one or more of a digital processor, an analog processor, a digital circuit designed to process information, an analog circuit designed to process information, a state machine, and/or other mechanisms for electronically processing information. Although processor(s) 158 is shown in FIG. 1 as a single entity, this is for illustrative purposes only. In some implementations, processor(s) 158 may include a plurality of processing units. These processing units may be physically located within the same device, or processor(s) 158 may represent processing functionality of a plurality of devices operating in coordination. The processor(s) 158 may be configured to execute computer readable instruction components 128, 130, 132, 134, 136, and/or other components. The processor(s) 158 may be configured to execute components 128, 130, 132, 134, 136, and/or other components by software; hardware; firmware; some combination of software, hardware, and/or firmware; and/or other mechanisms for configuring processing capabilities on processor(s) 158.

It should be appreciated that although components 128, 130, 132, 134, and 136 are illustrated in FIG. 1 as being implemented within a single processing unit, in implementations in which processor(s) 158 includes multiple processing units, one or more of components 128, 130, 132, 134, and/or 136 may be implemented remotely from the other components. The description of the functionality provided by the different components 128, 130, 132, 134, and/or 136 described herein is for illustrative purposes, and is not intended to be limiting, as any of components 128, 130, 132, 134, and/or 136 may provide more or less functionality than is described. For example, one or more of components 128, 130, 132, 134, and/or 136 may be eliminated, and some or all of its functionality may be provided by other ones of components 128, 130, 132, 134, and/or 136. As another example, processor(s) 158 may be configured to execute one or more additional components that may perform some or all of the functionality attributed below to one of components 128, 130, 132, 134, and/or 136.

The processor(s) 162 of server(s) 106 may be configured to provide information processing capabilities in server(s) 106. As such, processor(s) 162 may include one or more of a digital processor, an analog processor, a digital circuit designed to process information, an analog circuit designed to process information, a state machine, and/or other mechanisms for electronically processing information. Although processor(s) 162 is shown in FIG. 1 as a single entity, this is for illustrative purposes only. In some implementations, processor(s) 162 may include a plurality of processing units. These processing units may be physically located within the same device, or processor(s) 162 may represent processing functionality of a plurality of devices operating in coordination. The processor(s) 162 may be configured to execute computer program instruction components 140, 142, 144, 146, 148, and/or other components. The processor(s) 162 may be configured to execute components 140, 142, 144, 146, 148, and/or other components by software; hardware; firmware; some combination of software, hardware, and/or firmware; and/or other mechanisms for configuring processing capabilities on processor(s) 162.

It should be appreciated that although components 140, 142, 144, 146, and 148 are illustrated in FIG. 1 as being implemented within a single processing unit, in implementations in which processor(s) 162 includes multiple processing units, one or more of components 140, 142, 144, 146, and/or 148 may be implemented remotely from the other components. The description of the functionality provided by the different components 140, 142, 144, 146, and/or 148 described below is for illustrative purposes, and is not intended to be limiting, as any of components 140, 142, 144, 146, and/or 148 may provide more or less functionality than is described. For example, one or more of components 140, 142, 144, 146, and/or 148 may be eliminated, and some or all of its functionality may be provided by other ones of components 140, 142, 144, 146, and/or 148. As another example, processor(s) 162 may be configured to execute one or more additional components that may perform some or all of the functionality attributed below to one of components 140, 142, 144, 146, and/or 148.

Figure 2:
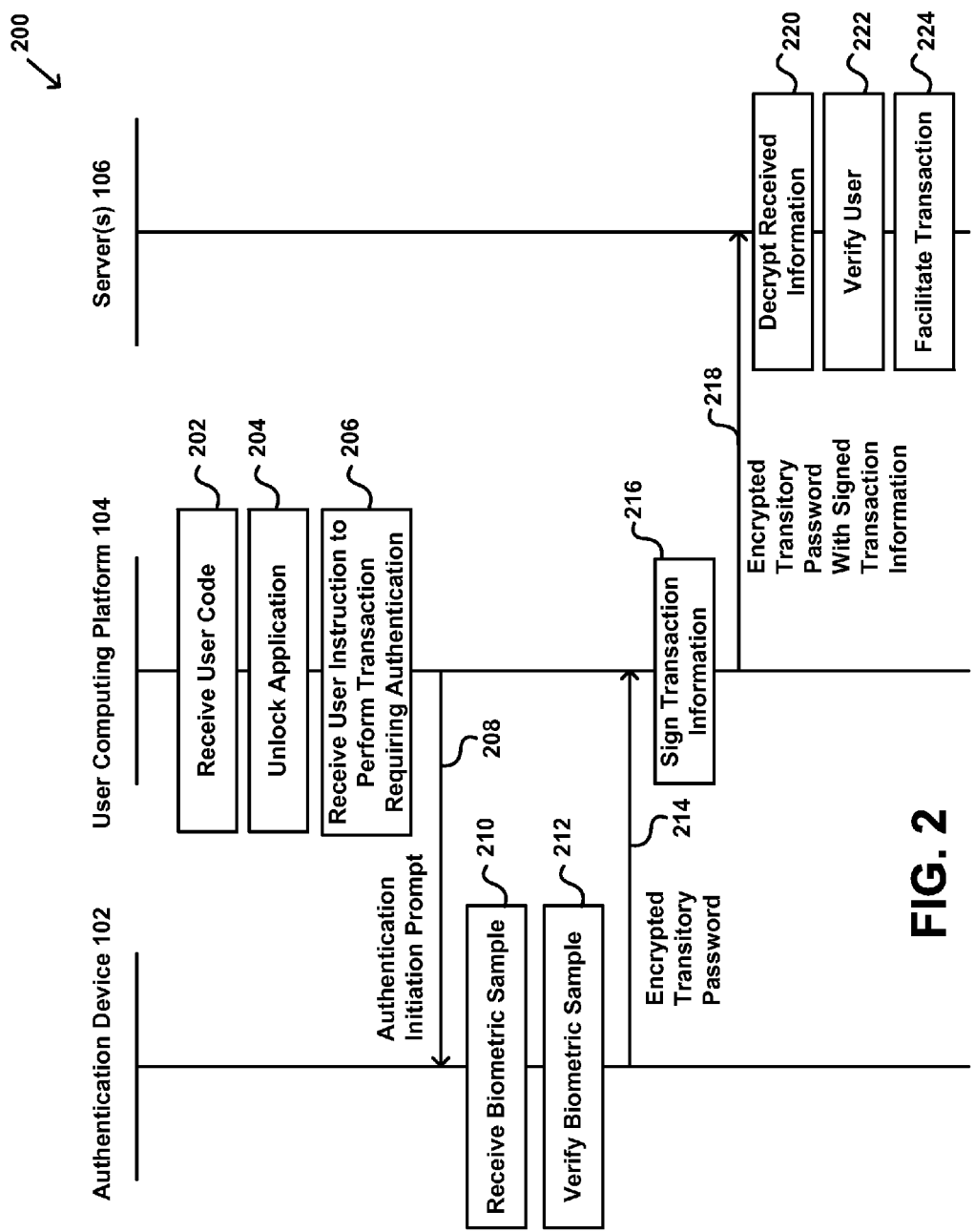
FIG. 2 illustrates a method for facilitating secure authentication using a biometric-enabled transitory password authentication device, in accordance with one or more implementations.

FIG. 2 illustrates a method 200 for facilitating secure authentication using a biometric-enabled transitory password authentication device, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a user code may be obtained from a user. Operation 202 may be performed at user computing platform 104. Operation 202 may be performed by one or more processors configured to execute a user code component that is the same as or similar to user code component 128, in accordance with one or more implementations.

At an operation 204, an application may be unlocked. The application may be running on a user computing platform (e.g., user computing platform 104) The application may be unlocked responsive to the correct user code being obtained (e.g., at operation 202). Operation 204 may be performed at user computing platform 104. Operation 204 may be performed by one or more processors configured to execute an unlock-app component that is the same as or similar to unlock-app component 130, in accordance with one or more implementations.

At an operation 206, a user instruction to perform a transaction requiring authentication may be received. Operation 206 may be performed at user computing platform 104. In some implementations, the user instruction may be received via a user interface presented by user computing platform 104. Operation 206 may be performed by one or more processors configured to execute a user-interface component that is the same as or similar to user interface component 132, in accordance with one or more implementations.

At an operation 208, an authorization initiation prompt may be provided to an authentication device (e.g., authentication device 102). The prompt may be configured to cause the authentication device to "wake up," turn on, become activated, and/or otherwise become ready to receive a biometric sample. The prompt may be provided by user computing platform 104 to authentication device 102. Operation 208 may be performed by one or more processors configured to execute an authentication initiation component that is the same as or similar to authentication initiation component 134, in accordance with one or more implementations.

At an operation 210, a biometric sample may be received from a biometric sensor. Operation 210 may be performed at authentication device 102. The biometric sample may be received from biometric sensor 108 of authentication device 102. Operation 210 may be performed by one or more processors configured to execute a biometric component that is the same as or similar to biometric component 116, in accordance with one or more implementations.

At an operation 212, the biometric sample may be verified. Operation 210 may be performed at authentication device 102. Operation 212 may be performed by one or more processors configured to execute a biometric component that is the same as or similar to biometric component 116, in accordance with one or more implementations.

At an operation 214, an encrypted transitory password may be transmitted to a user computing platform (e.g., user computing platform 104). The transitory password may be generated and encrypted at authentication device 102. The encrypted transitory password may be transmitted from authentication device 102 to user computing platform 104. Operation 214 may be performed by one or more processors configured to execute a one-way communications component that is the same as or similar to one-way communications component 124, in accordance with one or more implementations.

At an operation 216, transaction information may be signed. The transaction information may be associated with the transaction of operation 206. Signing the transaction information may be based on the encrypted transitory password. The transaction information may be encrypted based on the encrypted transitory password. The transaction information may include information that describes the transaction and/or information that is necessary to perform the transaction. Operation 216 may be performed at user computing platform 104. Operation 216 may be performed by one or more processors configured to execute a transaction component that is the same as or similar to transaction component 136, in accordance with one or more implementations.

At an operation 218, the encrypted transitory password may be transmitted with the signed transaction information to one or more servers (e.g., server(s) 106). The encrypted transitory password and the signed transaction information may be transmitted from user computing platform 104 to server(s) 106. Operation 218 may be performed by one or more processors configured to execute a transaction component that is the same as or similar to transaction component 136, in accordance with one or more implementations.

At an operation 220, the user may be verified. The user may be verified by determining whether the transitory password received from the user computing platform, once decrypted, is valid. Operation 220 may be performed at the server(s). Operation 220 may be performed by one or more processors configured to execute a verification component that is the same as or similar to verification component 146, in accordance with one or more implementations.

At an operation 224, the transaction may be facilitated. Facilitating the transaction may include effectuating one or more of authentication of third-party applications, authentication of debit card payments, authentication of regulated and secure digital currency (e.g., bitcoin) based payment services, use of credit cards via the NFC transmission protocol, QR-based authentication and payment services, and/or other transactions which require sensitive data. Operation 224 may be performed at server(s) 106. Operation 224 may be performed by one or more processors configured to execute a server-side transaction component that is the same as or similar to server-side transaction component 148, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for facilitating secure biometric-enabled payment over a network using a standalone authentication device that retains all biometric information to avoid interception and/or corruption of such biometric information, the system comprising:
   an authentication device;
   a user computing platform communicatively coupled with the authentication device; and
   one or more servers communicatively coupled with the authentication device, the one or more servers having one or more processors configured by computer readable instructions to:
     provide an authentication prompt to a user via the user computing platform associated with the user responsive to the user attempting to facilitate a secure biometric-enabled payment over the network;
     receive, at one or more processors of one or more servers, a time-based one-time password responsive to the authentication prompt being provided, the time-based one-time password being received from the authentication device proximate to and communicatively coupled with a user computing platform, the authentication device being physically separate and distinct from the user computing platform, the authentication device being configured to:
       (1) receive a biometric sample from the user of the user computing platform;
       (2) internally verify the biometric sample such that the biometric sample does not leave the authentication device; and
       (3) provide the time-based one-time password responsive to the biometric sample being verified; and
     effectuate the secure biometric-enabled payment over the network;
   wherein while information is transmitted by the authentication device, no information may be received by the authentication device, and wherein verification of the biometric sample is required in order to allow information to be transmitted from the authentication device.

2. The system of claim 1, wherein the authentication device is disposed proximate to the user computing platform.

3. The system of claim 2, wherein the authentication device is configured to adhere to an external surface of the user computing platform.

4. The system of claim 2, wherein the authentication device is embodied within a case configured to removably attach to and cover a portion of the user computing platform.

5. The system of claim 1, wherein the authentication device is configured for one-way communication such that information is transmitted from the authentication device to the user computing platform but no information is received by the authentication device.

6. The system of claim 1, wherein the authentication device includes a biometric sensor configured to obtain the biometric sample from the user.

7. The system of claim 6, wherein the biometric sensor includes a fingerprint scanner and the biometric sample is a fingerprint belonging to the user.

8. The system of claim 1, wherein the biometric sample is verified at the authentication device based on a comparison between the biometric sample and biometric information stored by the authentication device.

9. The system of claim 8, wherein the biometric information stored by the authentication device includes a biometric exemplar or template associated with the biometric sample.

10. The system of claim 1, wherein the one or more processors of the one or more servers are further configured by the computer readable instructions to provide a server-side transitory password that changes periodically based on passage of time, the server-side transitory password being provided synchronously with a transitory password provided by the authentication device, the server-side transitory password being the same as the transitory password provided by the authentication device.

11. The system of claim 10, wherein determining the validity of the user is based on whether a decrypted transitory password matches the server-side transitory password.

12. A computer-implemented method for facilitating secure biometric-enabled payment over a network using a standalone authentication device that retains all biometric information to avoid interception and/or corruption of such biometric information, the method being performed by one or more processors included in one or more servers, the method comprising:
providing an authentication prompt to a user via a user computing platform associated with the user responsive to the user attempting to facilitate a secure biometric-enabled payment over the network;
receiving, at one or more processors of one or more servers, a time-based one-time password responsive to the authentication prompt being provided, the time-based one-time password being received from an authentication device proximate to and communicatively coupled with a user computing platform, the authentication device being physically separate and distinct from the user computing platform, the authentication device being configured to:
(1) receive a biometric sample from the user of the user computing platform;
(2) internally verify the biometric sample such that the biometric sample does not leave the authentication device; and
(3) provide the time-based one-time password responsive to the biometric sample being verified; and
effectuating the secure biometric-enabled payment over the network;
wherein while information is transmitted by the authentication device, no information may be received by the authentication device, and wherein verification of the biometric sample is required in order to allow information to be transmitted from the authentication device.

13. The method of claim 12, wherein the biometric sample is verified at the authentication device based on a comparison between the biometric sample and biometric information stored by the authentication device.

14. The method of claim 12, further comprising providing, at the one or more processors of the one or more servers, a server-side transitory password that changes periodically based on passage of time, the server-side transitory password being provided synchronously with a transitory password provided by the authentication device, the server-side transitory password being the same as the transitory password provided by the authentication device.

15. The method of claim 14, wherein determining the validity of the user is based on whether a decrypted transitory password matches the server-side transitory password.

16. A standalone authentication device that retains all biometric information to avoid interception and/or corruption of such biometric information, the authentication device comprising:
one or more processors configured by computer readable instructions to:
(1) receive a biometric sample from the user of the user computing platform;
(2) internally verify the biometric sample such that the biometric sample does not leave the authentication device; and
(3) provide the time-based one-time password responsive to the biometric sample being verified; and
effectuate a secure biometric-enabled payment over a network;
wherein while information is transmitted by the authentication device, no information may be received by the authentication device, and wherein verification of the biometric sample is required in order to allow information to be transmitted from the authentication device.

17. The authentication device of claim 16, wherein the authentication device is configured to be disposed proximate to a user computing platform.

18. The authentication device of claim 17, wherein the authentication device is configured to adhere to an external surface of a user computing platform.

19. The authentication device of claim 17, wherein the authentication device is embodied within a case configured to be removably attached to and cover a portion of a user computing platform.

20. The authentication device of claim 16, wherein the authentication device includes a biometric sensor configured to obtain a biometric sample from a user, the biometric scanner includes a fingerprint scanner, and the biometric sample is a fingerprint belonging to the user.

* * * * *